March 29, 1927.

A. C. FRUE 1,622,439

DEVICE FOR OPERATING SWITCHES

Filed Dec. 14, 1925    2 Sheets-Sheet 1

Inventor
Alexander C. Frue

J. Kaplan
Attorney

March 29, 1927.                                                    1,622,439
A. C. FRUE
DEVICE FOR OPERATING SWITCHES
Filed Dec. 14, 1925                             2 Sheets-Sheet 2
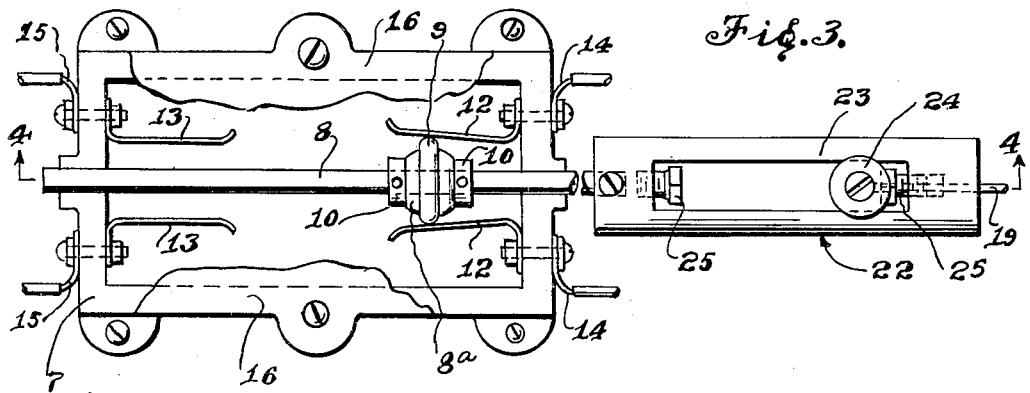
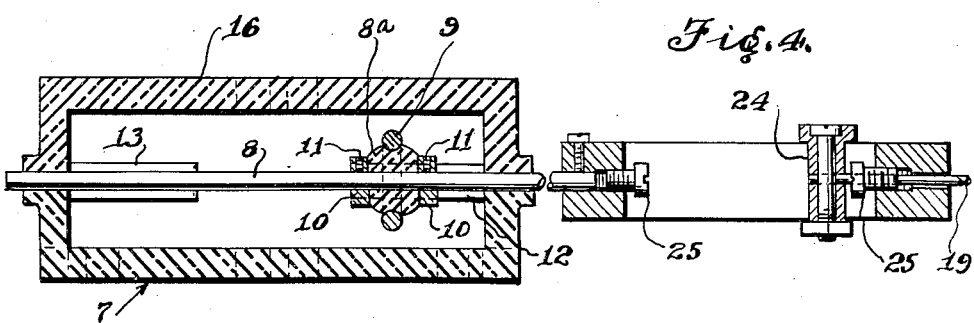
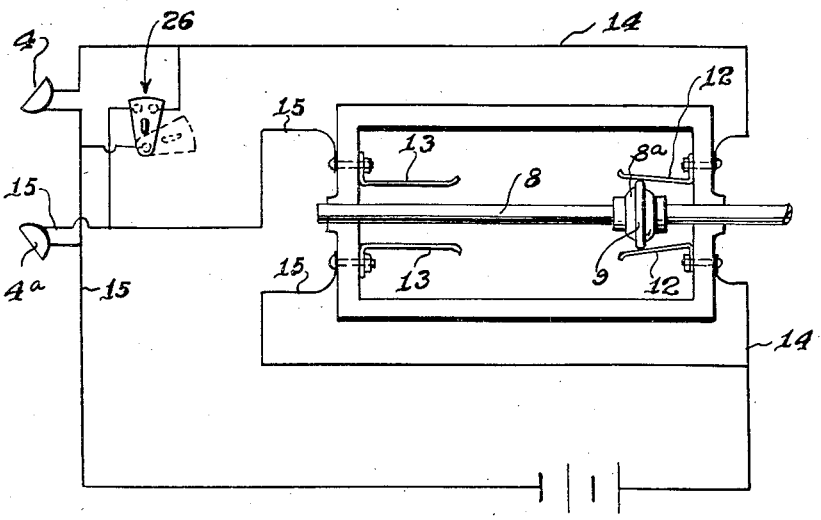
Inventor
Alexander C. Frue
By
J. Kaplan
Attorney Patented Mar. 29, 1927.

1,622,439

UNITED STATES PATENT OFFICE.

ALEXANDER C. FRUE, OF DETROIT, MICHIGAN.

DEVICE FOR OPERATING SWITCHES.

Application filed December 14, 1925. Serial No. 75,262.

This invention relates to automobile headlights and more particularly to means to light the sides of a road not illuminated by the usual headlights, when making a turn.

The principal object of the invention is the provision of means to automatically light the left or right side of a road when the steering gear of an automobile is turned either to the left or right in order to enable the driver to see his way.

Another object of the invention is the provision of means operable by the steering gear of the car for actuating a circuit closer.

Other objects will appear as the disclosure progresses. The drawings are intended merely to indicate a possible embodiment of the invention. It is obvious that the actual needs of manufacture may necessitate certain mechanical changes. It is therefore not intended to limit the invention to the embodiment illustrated, but rather to define such limits in the appended claims.

In general the device consists of a circuit closer attached to the frame of the chassis of a motor vehicle, a steel wire passing through a tube having one end attached to the sliding rod of the circuit closer and the other end fastened to the oscillating arm of a steering gear.

For a more detailed understanding of the invention, attention is now called to the drawings in which a preferred embodiment is shown illustrated. In these drawings like parts are designated by like reference characters in all the views.

Fig. 3 is a top view of the circuit closer with the cover partly broken away.

Fig. 4 is a section on line 4—4 of Fig. 3.

Fig. 5 is the wiring diagram.

Figure 1:
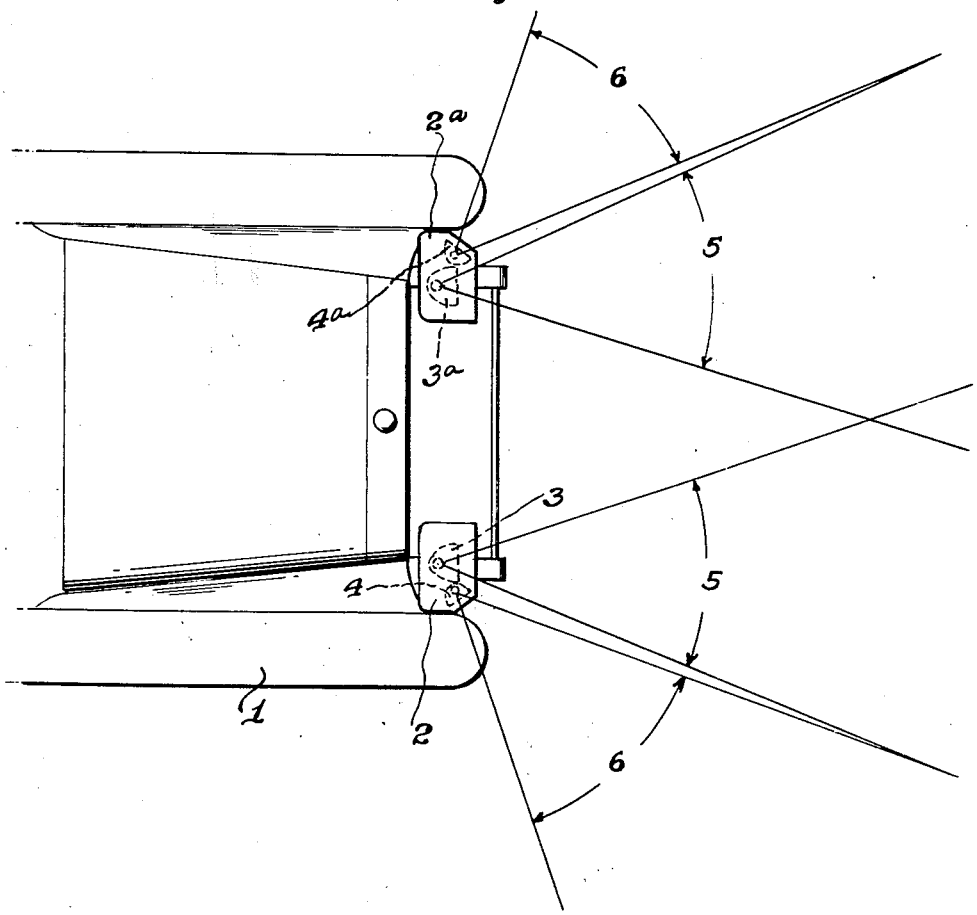
Fig. 1 is a diagrammatic view showing the headlights in operation.

The material to be used in this device may be of any suitable nature such as may be suggested by the needs of manufacture.

Referring now more particularly to the drawings, numeral 1 designates the motor vehicle and 2 and 2ª the headlights. The headlights are composed of the usual reflectors 3 and 3ª and auxiliary reflectors and lights 4 and 4ª. Numeral 5 designates the area lighted by the usual headlights and 6 the area lighted by the auxiliary lights.

The circuit closer for operating the auxiliary lights is composed of a box-like structure 7 of insulating material and within is a sliding rod 8 having attached thereon an insulated sleeve 8ª on which is fastened a conducting ring 9. To adjust the position of the sleeve on the sliding rod, collars 10 having set screws 11 therein are provided. Numerals 12 and 13 designate flexible contact plates and 14 and 15 conducting wires leading thereto and 16 a cover to keep the mechanism dust-proof.

Figure 2:
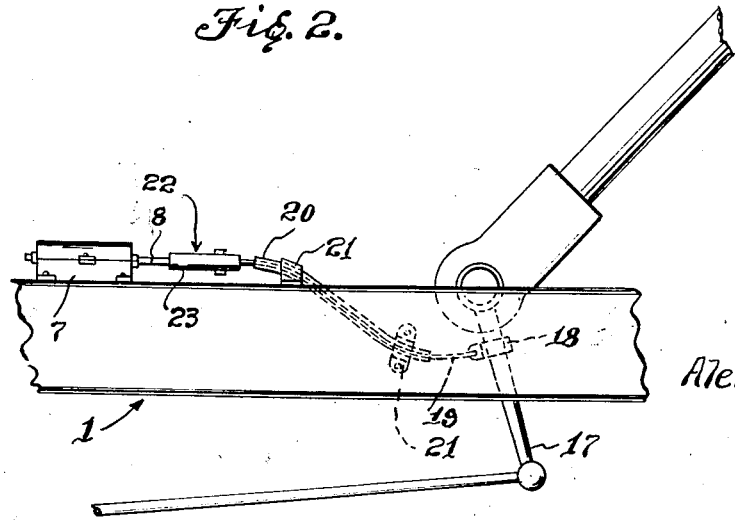
Fig. 2 is a view showing the circuit closer attached to the chassis of an automobile.

As noted in Fig. 2 the circuit closer is operable by the oscillating arm 17. Attached to this arm is a clamp 18 to which is fastened a steel wire 19 passing through a tube 20, the said tube being fastened to the chassis by clamps 21. The other end of the wire 19 is attached to a lost motion link 22 and the opposite end of the lost motion link is fastened to the sliding rod 8.

The lost motion link is composed of a slotted element 23 into which slot the post 24 having a steel wire 19 fastened thereto is adapted to move. Set screws 25 are provided for adjusting the amount of movement of the post 24. On the dashboard of the vehicle a switch 26 is provided in order to break the circuit and make the lights inoperative in the daytime. As noted in Fig. 5 in the wiring diagram, when the rod 8 is moved to the right the current from the battery will flow through the conductors 14 and light the headlight 4 and when the rod is moved to the left the current will flow through the conductors 15 and light the headlight 4ª.

The purpose of the loose play link is to prevent the lights from operating when a slight turn is made.

The operation of this device is entirely automatic. When the driver turns to the right the headlight will illuminate the area to the right of the road and when the car is turned to the left the area to the left of the car will be illuminated.

The structure and operation of this device has now been fully set forth.

What I desire to secure by United States Letters Patent is:

1. In a device of the class described in combination, means for actuating a circuit closer for operating vehicle lights, the said means including a loose play link, means to adjust the amount of loose play of said link, a flexible wire attached to a post, said post adapted to move in a slot of said link, a tube for guiding said flexible wire, said wire attached to a moving part of the steering gear of a motor vehicle and so arranged that the movement of the steering gear will be transmitted to the said circuit closer.

2. In a device of the class described in combination, a loose play link for actuating a circuit closer for operating vehicle lights, one end of said link attached to a slidable rod of said circuit closer, a post adapted to move in said link, a flexible wire attached to said post at one end and the other end to a moving part of the steering gear of a motor vehicle and a tube fastened to the chassis of a motor vehicle for guiding said wire.

3. In a device of the class described in combination, a loose play link having a slot therein, one end of said link fastened to a slidable rod of a circuit closer, a post adapted to move in said slot, means for fastening one end of a flexible wire to said post, the said means consisting of bolt having a hole therein and housed in said post, the said bolt adapted to wedge the end of said wire against the post when screwed in place, a pair of set screws at both ends of said slot for regulating the movement of said post, said flexible wire passing through a tube and attached to a moving part of the steering gear of a motor vehicle, the motion of the said part of a motor vehicle adapted to be transmitted to the rod of a circuit closer.

In testimony whereof I affix my signature.

ALEXANDER C. FRUE.